United States Patent [19]

Drake

[11] Patent Number: 4,887,493
[45] Date of Patent: Dec. 19, 1989

[54] ROLLER CUTTER DRILL BIT AND METHOD OF FORMING

[75] Inventor: Eric F. Drake, Houston, Tex.
[73] Assignee: Reed Tool Company, Houston, Tex.
[21] Appl. No.: 218,642
[22] Filed: Jul. 13, 1988
[51] Int. Cl.$^4$ .............................................. B21K 57/02
[52] U.S. Cl. .................................. 76/5 R; 76/108 A; 29/800
[58] Field of Search ................. 76/5 R, 108 A, 108 R, 76/101 E, DIG. 11, DIG. 12; 29/447, 800

[56] References Cited

U.S. PATENT DOCUMENTS 2,687,875  8/1954  Morlan et al. .
3,621,550  11/1971  Colestock ............................ 29/800
4,360,069  11/1982  Davis .
4,744,270  5/1988  Vezirian .

Primary Examiner—Roscoe V. Parker
Attorney, Agent, or Firm—Dodge Bush & Moseley

[57] ABSTRACT

A rolling cutter (24) for a rotary drill bit (10) having cutting inserts or elements (52) mounted within sockets (54) in a so-called full shrink process. The rolling cutter (24) is heated to a temperature over around 500° F. in a controlled inert atomsphere in an enclosed heat chamber (71) and the inserts (52) are positioned by gravity within the sockets (54) in a slip fit for retention in an interference fit by shrinkage of the cutter body (25).

22 Claims, 5 Drawing Sheets

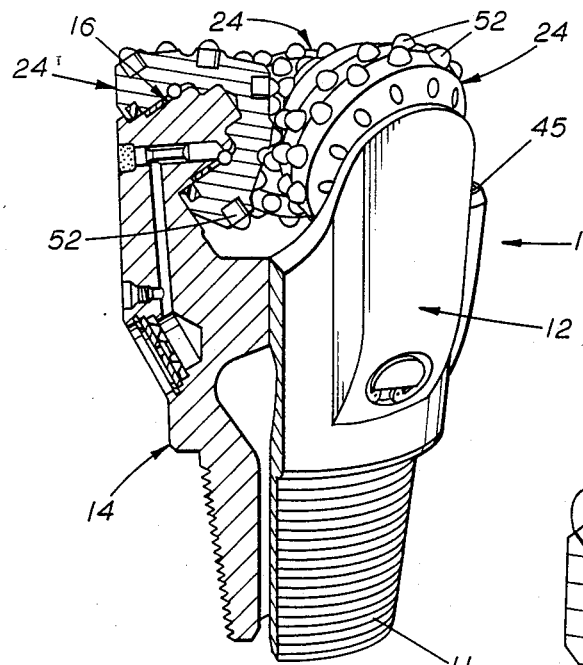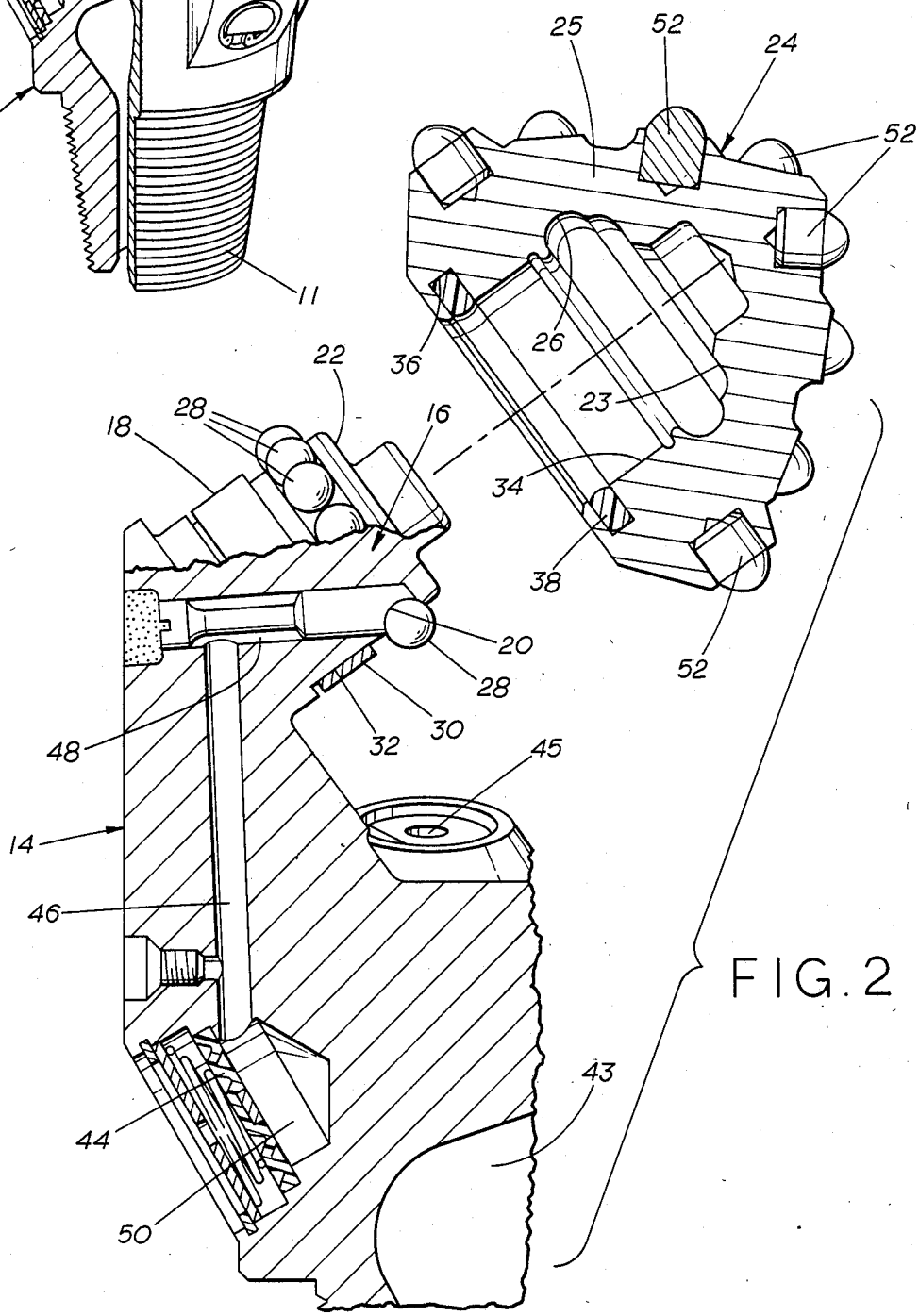

ROLLER CUTTER DRILL BIT AND METHOD OF FORMING

BACKGROUND OF THE INVENTION

This invention relates to rolling cutter drill bits and more particularly to such a drill bit having rolling cutters with cutting inserts or elements mounted within sockets on the cutters, and including the method and apparatus for mounting such inserts on the rolling cutters.

Heretofore, in rolling cutter drill bits in which rolling cone cutters are mounted on the drill bit body for rotation, the cutting elements or inserts have been inserted within openings in the cutter body by a press fit or the combination of a press-fit and shrink fit. Such press fitting of inserts heretofore has been accomplished at a temperature less than around 500° F. as temperatures greater than 500° F. tended to soften the material from which the roller cutter bodies were formed. The materials used for rolling cutters normally have been treated to provide a case hardened surface by carburizing as low-carbon alloy steels are normally utilized for rolling cutters. Relatively low tempering temperatures, such as 300° F. to 500° F., are utilized in obtaining the case hardening of the desired surfaces in the rolling cutters from heat treating in an austenitizing, quenching and tempering cycle.

As an example of such hardening, reference is made to U.S. Pat. No. 4,303,137 dated Dec. 1, 1981 in which ball bearing races of the rolling cutter are carburized, slowly cooled, and annealed for subsequent machining. The cutter is then heat treated by oil quenching from the austenitizing temperatures and then tempered from 400° F. to 500° F. and thus subsequent reheating in the 400–500° F. range has a minimal effect on core and case hardnesses. It is apparent therefore that the temperatures to which rolling cutters have been tempered heretofore have not been above around 500° F. as higher temperatures affect the hardness and strength of the cutter bodies.

However, on the other hand, drag type drill bit with polycrystalline diamond compact (PDC) cutting elements have been formed by heat treated steels which have a microstructural stability at 1000° F. or higher and cutting inserts have been inserted within sockets in the drag type bit body at temperatures as high as 650° F. as disclosed in U.S. Pat. No. 4,360,069, Nov. 1982. A drag type bit does not have journals or bearings which require wear and deformation-resistant surfaces and which also require machining to precise tolerances as necessary for rolling cutters. For these reasons, non-carburizing grades of steel and less complex heat treatments have been used heretofore for drag type bits. In addition, the complexity of typical PDC cutter distributions creates a need for sophisticated fixturing means for press-fitting which is alleviated by using a shrink fit methodology.

Normally for rolling cutter bits, the insert is press-fitted into a mating socket or opening in the cone which is slightly smaller than the insert so that an interference fit is created when the insert is forced into the socket. Under service loading, an insert can become loose and rotate, or actually be dislodged from the cone body. To minimize this problem, an interference of several thousandths of an inch is usually utilized. The precise control of interference levels is known to be critical to bit performance since at low interference the tendency for loosening of the inserts is increased, and at higher interferences, the tendency for cracking of the cutter shell between inserts or at the base of insert holes is increased, leading to cone failure as well as insert loss.

Press fitting of inserts within sockets results in elastic as well as plastic deformation of near surface regions and of asperities or surface irregularities on the outer surface of the insert and the inner contacting surface of the receiving socket. When such plastic deformation occurs during the forcing or pressing of the inserts within the sockets, elastic stresses are redistributed and there is an overall reduction in the effective interference, asperity interaction, and corresponding normal and traction forces acting to retain the insert in its socket. In addition, stress concentrations or high stress areas can also develop in areas where plastic deformation is localized such as at the corner of the insert bottom chamfer or in portions of the hole preferentially loaded due to off-axis pressing or geometrical imperfections. Even when press-fitting into cutter bodies preheated to a temperature as high as 500° F., significant force may be required to press in inserts, causing plastic deformation along the surface contact areas between the outer surface of the inserts and the inner surrounding surface of the receiving sockets. Moreover, the reduction in elastic interference stresses due to localized plasticity along the hole wall cannot be substantially compensated by increased design interference levels because the total integrated cutter strain which affects cutter cracking is principally determined by nominal interferences and is relatively insensitive to local plasticity in the hole. The reduction of effective interferences combined with the development of non-uniformity of stress along the hole depth cause an increased vulnerability of inserts to becoming dislodged from the sockets tending particularly under prolonged periods of use under harsh conditions at high temperatures.

Rock drilling is a very demanding service and the cones or cutters of a rock bit are heat treated to a substantial hardness and certain internal surfaces of the roller cone are carburized to obtain a relatively thick, hard case. Such surfaces include internal bearing surfaces which must be sufficiently hard to avoid undue wear and support the contact loads in demanding drilling service.

Tungsten carbide inserts are normally mounted in a tough, strong material forming the body of the cone or cutter and the inserts are retained in the cutter body by friction and traction maintained by radial compressive stress normal to the interface and hoop tensile stress in the cutter material developed when the insert is pressed into the relatively tough, strong cutter body. The loss of an insert during drilling may cause considerable damage as a result of its hardness to the remainder of the cutting structure by becoming mashed or wedged between two or more of the cones or cutters. This may result in chippage or breaking of other inserts which can result in substantial damage to the bit at times requiring a possible removal and replacement of the bit. An early removal of the bit from the borehole and replacement with a new bit is time consuming and increases the cost of the drilling of the hole.

Additionally, upon the press fitting of inserts within sockets of a roller cone body, fluid may be trapped and compressed within the bottom of the socket which may cause anomalous stress conditions at the hole bottom which can contribute to harmful cracking or increased plasticity.

SUMMARY OF THE INVENTION

The present invention is particularly directed to rolling cutter drill bits in which the cutting inserts are mounted within receiving sockets in the rolling cutter body while the rolling cutting body is at a relatively high temperature such that a slip-fit condition exists between the insert and the hole so that upon subsequent cooling and shrinkage, a so-called "full shrink fit" resulting in a uniform interference fit is obtained throughout the entire surface contact areas between the outer surfaces of the inserts and the adjacent inner contacting surfaces of the receiving sockets. The cutting inserts which are chilled or at ambient temperatures are slip-fitted within sockets of a rolling cutter body which has been previously heated in a controlled atmosphere to a temperature over at least around 500° F. and preferably around nine hundred and fifty degrees (950°)F. The cutter bodies are formed of common metal materials which have a minimum yield strength of 160,000 psi even after the mounting of inserts into the sockets at temperatures above 500° F. and subsequent cooling to room temperature. After assembly and cooling, selective hardening of bearing surfaces may be accomplished on the cutter bodies by the utilization of laser, induction, or electron beam heating.

The unusually tight uniform interference fit between the inserts and receiving sockets obtained by the so-called full shrinkage fit was unexpected when testing of rolling cutters in which the cutting inserts were inserted in the cutter bodies indicated that the force required to press out such inserts with a full shrink fit was around three times the force required to press out similar inserts which were inserted with a press fit at the same interference level. Such a result in the holding force for full shrink fit inserts without any press fit required and which increases the holding force for an insert three hundred percent (300%) was unexpected for a rolling cutter drill bit.

Since the insert is slip-fit into the socket, there is little or no plastic deformation or shearing of asperities or surface irregularities on the outer surface of the inserts and the inner contacting surfaces of the sockets. Thus, upon subsequent cooling and shrinkage, a uniform mechanical bonding or interlocking of adjacent asperities between the contacting surfaces of the inserts and the sockets is obtained. The inserts which are at ambient temperature or chilled to a temperature as low as −450° F. prior to insertion are heated to the relatively high temperature of the cutter body in a few seconds after insertion and the immediate expansion of the inserts relative to the cutter body effects a merging or interlocking of the two surfaces at such high temperature or during cooling with no substantial shearing of asperities or near surface plasticity. Upon cooling of the cutter body and mounted inserts from the relatively high temperatures, differential shrinkage between the insert and cutter is accommodated by elastic strain resulting in an unusually high and unexpected holding force.

Steel materials which have a minimum yield strength of 160,000 psi after final assembly in the completed rotary drill bit have been found to be satisfactory for the rolling cutter bodies of the invention and may be heat treated by quenching and tempering to a hardness of around 38 to 40 Rockwell C prior to the assembly of the inserts by a full shrink fit. The cemented tungsten carbide inserts preferably have a hardness of around 85–90 Rockwell A and may be chilled to a temperature as low as −450° F. prior to insertion. Such chilling of inserts 52 may be obtained by refrigeration or cryogenic treatment, for example. The cutter body is heated in a reducing or inert atmosphere such as nitrogen to a relative high temperature preferably around 900° F. and the chilled inserts are then positioned within the receiving sockets without any press fitting required.

Suitable apparatus for mounting such inserts within the sockets of a heated cutter body in a controlled atmosphere is provided to include means to move the cutter body so that a socket is aligned with means to slip-fit the insert within the aligned socket. Such apparatus includes an enclosed heat chamber to receive the prescribed gas composition and to maintain the cutter at a predetermined high temperature during the mounting of the inserts within the sockets. The apparatus utilizes the method of this invention in carrying out the steps of the method.

It is an object of this invention to provide a rolling cutter for a rotary drill bit in which the cutting inserts are retained within receiving sockets in the rolling cutter body under an unusually high retaining force resulting from a uniform interference fit with adequate hardness of bearing surfaces and with adequate toughness in the core of the cutter body.

A further object of the invention is to provide such a rolling cutter in which the cutting inserts are mounted within receiving sockets in the heated cutter body by slip—rather than press-fitting with the inserts being required and with the inserts being retained in the sockets from shrinkage resulting from cooling of the inserts and cutter body after assembly.

An additional object of the invention is to provide such a rolling cutter and method of assembly of the inserts within the rolling cutter body by the heating of the rolling cutter body to a relatively high temperature in a reducing or inert atmosphere, and the mounting of such inserts within the sockets in a controlled atmosphere thereby to control or preclude any oxidation or other surface reactions of the inserts and the cutter body surfaces.

Another object is to provide an apparatus for mounting inserts within the sockets of a heated cutter body by slip-fit by accurate alignment of the sockets with insert loading means and maintaining of the cutter body at a predetermined high temperature in a predetermined gaseous atmosphere during the mounting operation.

Other objects, features and advantages of the invention become more apparent after referring to the following specification and drawings.

BRIEF DESCRIPTION OF THE DRAWINGS

FIG. 1 is an elevation of a roller cutter drill bit with one leg thereof shown in section and having a roller cutter mounted thereon for rotation including cutting inserts mounted within sockets of the rolling cutter body;

FIG. 2 is a sectional view of a leg shown in FIG. 1 but showing the roller cutter or cone removed from the journal on the end of the leg;

DETAILED DESCRIPTION

Figure 3:
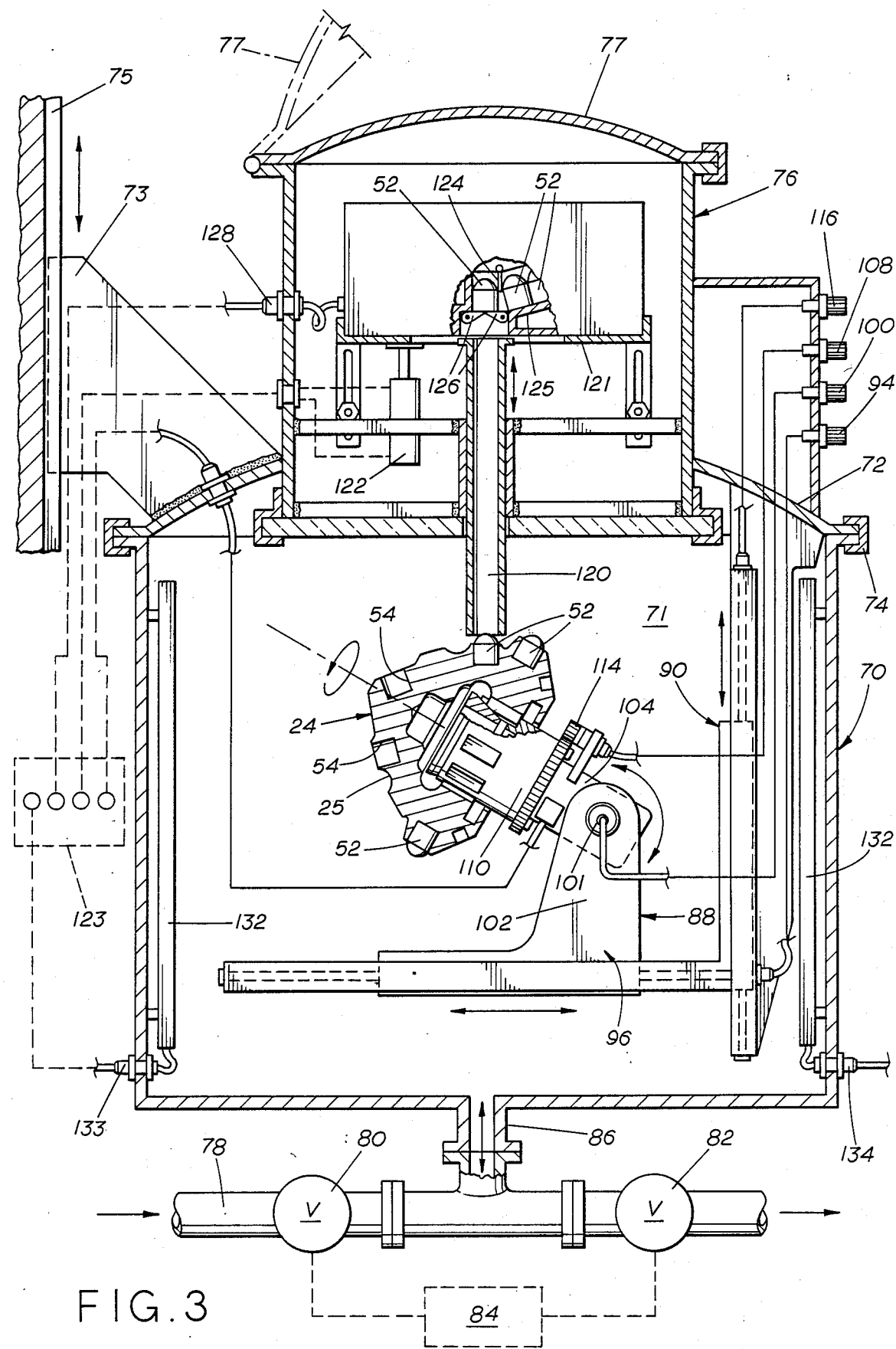
FIG. 3 is a sectional view, partly schematic, showing the apparatus for the heating of the rolling cutter in an inert atmosphere and for mounting the cutting elements of inserts within receiving sockets of the cutter body.

Referring now to the drawings for a better understanding of this invention, and more particularly to FIGS. 1 and 2, a rotary drill bit is shown generally at 10, having a threaded end 11 adapted to be connected to the lower end of a drill string "not shown" and to receive drilling fluid from the bore of the drill string. The bit body 12 normally comprises three legs or lugs 14, each forming a 120° segment and welded to each other to form an integral bit body.

Each leg or lug 14 has a journal shown generally at 16 having a cylindrical bearing 18 with an annular groove 20 therein, and an end thrust bearing 22. A rolling cutter is shown generally at 24 having a thrust bearing area 23 adjacent thrust bearing 22 and an annular groove 26 adjacent groove 20 to receive ball bearings 28 in contact relation with the surfaces defining grooves 20 and 26. A bushing 30 fits around the outer peripheral surface of journal 18 between bearing surface 32 on journal 18 and bearing surface 34 on rolling cutter 24. A groove 36 in cutter body 24 has an elongated 0-ring 38 therein for sealing between journal 16 and cutter 24.

Drilling fluid from the drill string is received in a fluid chamber partially shown at 43 adapted to receive drilling fluid at a relatively high fluid pressure from a passage in the drill string for discharge from nozzle 45 at the lower end of the drill bit for exit of drilling fluid from bit body 12.

The lubricating system includes a lubricant reservoir 44 holding a supply of lubricant and lubricant passages 46 and 48 extending to the bearing areas of journal 18. A diaphragm 50 in lubricant chamber 44 tends to equalize the fluid pressure between lubricant chamber 44 and the pressure of the drilling fluid adjacent rolling cutter 24.

Figure 6:
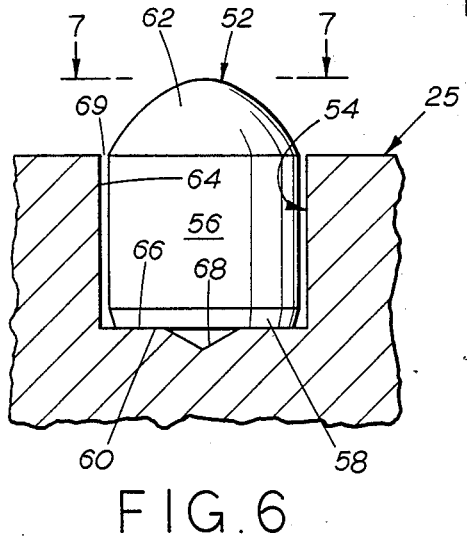
FIG. 6 is an enlarged section of a fragment of a rolling cutter body showing a receiving socket and cutting insert immediately after slip-fitting of the insert within the socket in the heated cutter body and prior to expansion of the cutting insert.
Figure 7:
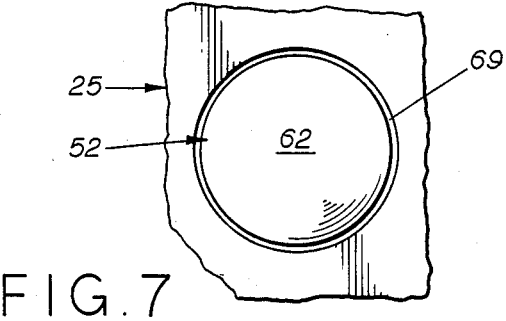
FIG. 7 is a top plan of the insert and socket shown in FIG. 6, and showing an annular clearance between the insert and socket.
Figure 8:
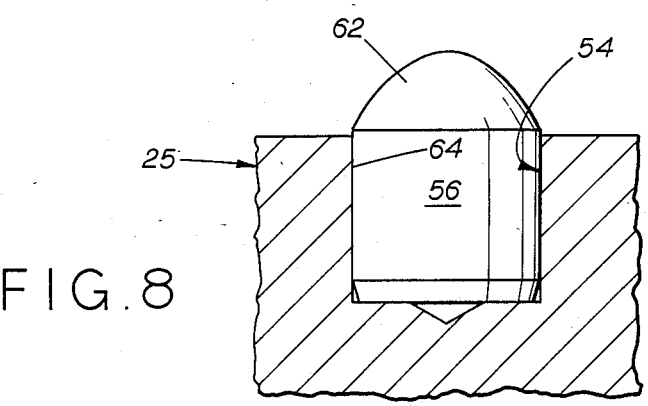
FIG. 8 is an enlarged section of the insert and socket of FIGS. 6 and 7 shown after expansion of the cutting insert and subsequent cooling of the cutter body and insert with the insert being retained by an interference fit resulting from shrinkage.
Figure 9:
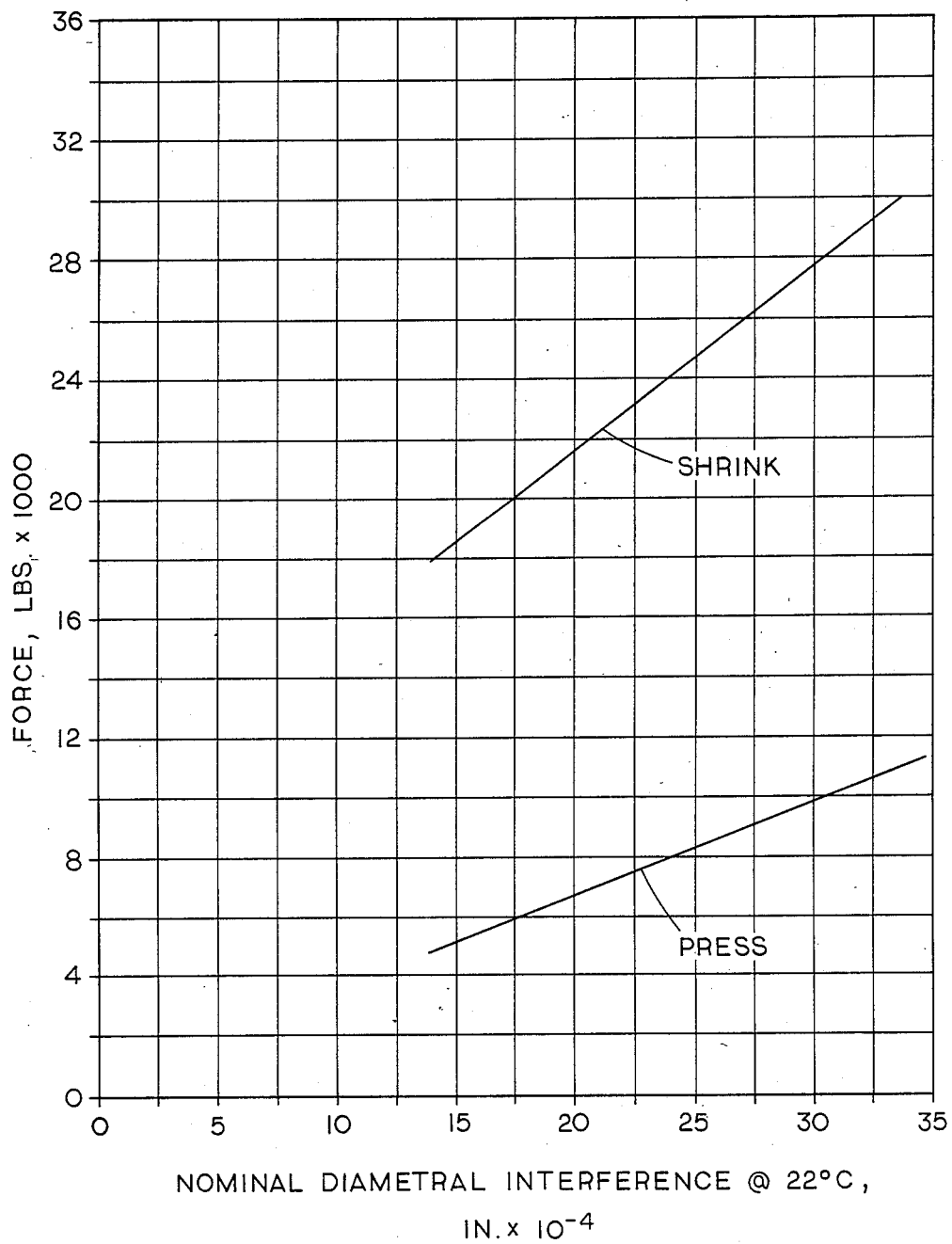
FIG. 9 is a graph comparing the holding force for press fitted inserts with the holding force for shrink fitted inserts for one example prepared in accordance with the present invention.

Frusto-conical body 25 of cutter 24 as shown particularly in FIGS. 6–8 has cutting elements 52 arranged in angular rows on body 25. Each cutting element 52 is positioned and secured within a receiving socket blind end opening 54 in cutter body 25. An important feature of this invention is in the placement and securement of cutting elements 52 within sockets 54 in a so-called full shrink interference fit without any appreciable press fitting of cutting elements 52 being required. Cutting element 52 has a generally cylindrical outer peripheral surface 56, an inner tapered end 58, an inner end surface 60, and a general hemispherical outer projecting end surface 62. Socket 54 is defined by an inner peripheral wall surface 64 and an end or bottom surface 66 having a central indentation 68 therein. As previously indicated, surface irregularities or asperities are formed on peripheral surface 56 of cutting element 52 and on adjacent peripheral wall surface 64 of socket 54. If asperities and rear-surface regions of the hole are plastically deformed upon the insertion of cutting element 52 in socket 54 such as might occur from a press fitting of cutting inserts 52 in sockets 54, an appreciable and non-uniform reduction in traction forces at the interface occurs. If inserts 52 are positioned within sockets 54 with no substantial pressing force, then shearing of any asperities and surface plasticity does not occur, and the maximum level of elastic strain energy is available to maintain interface traction forces. FIGS. 6 and 7 show cutting elements 52 as will be explained further below immediately after inserted within socket 54 in the heated body 25 prior to heating and expansion of cutting element 52 and an annular clearance 69 is provided between cutting elements 52 and socket 54. FIG. 8 shows cutting element 52 after expansion and in contacting relation with peripheral surface 64 defining socket 54.

Figure 4:
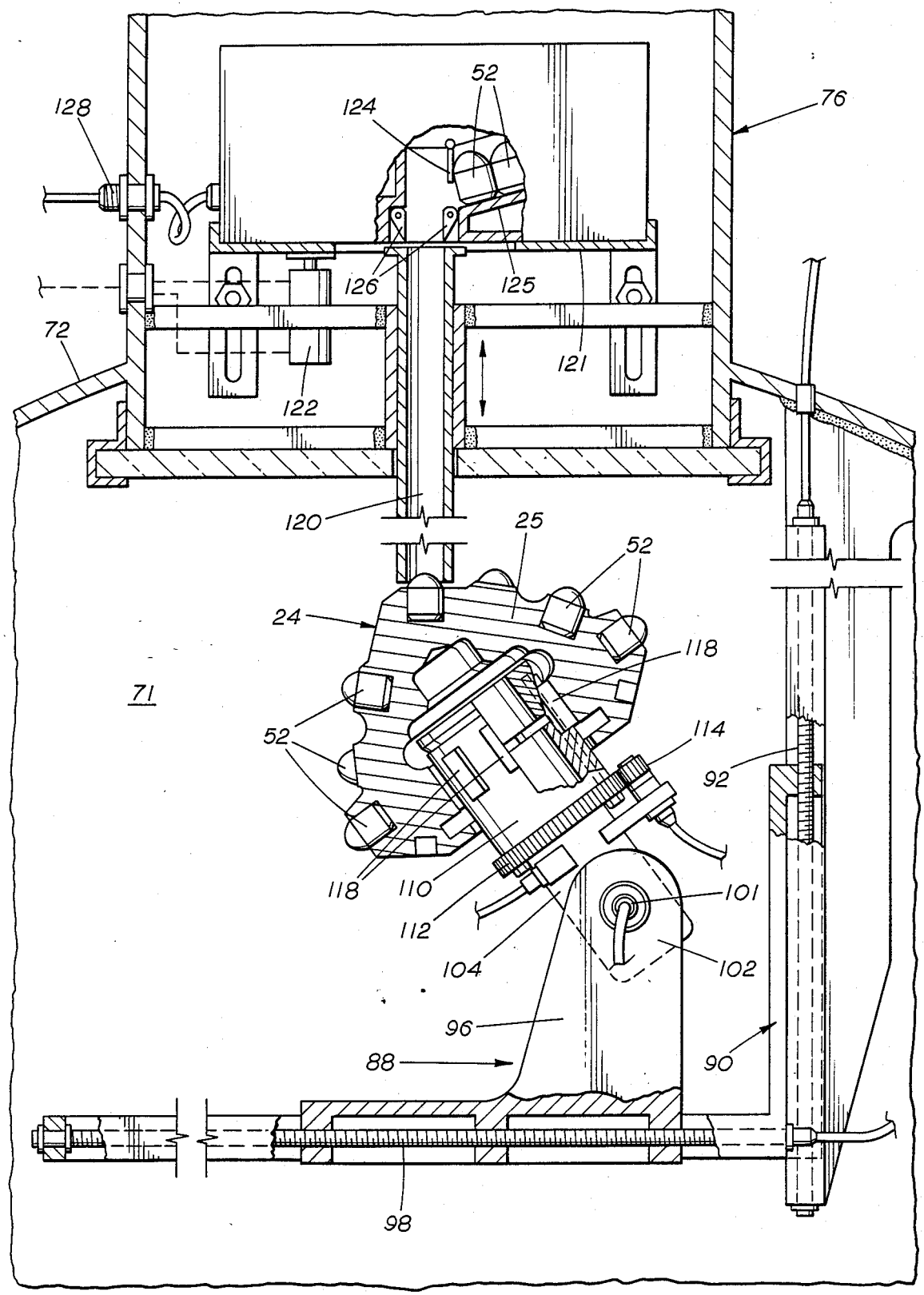
FIG. 4 is an enlarged fragment of FIG. 3 illustrating particularly the means for rotating the cutter body and means, for inserting a cutting insert within a socket in the heated cutter body.

Referring now particularly to FIGS. 3 and 4, an apparatus for slip fitting cutting inserts 52 in sockets 54 in a so-called full shrink method or process without any press fitting being provided is illustrated. An inert atmosphere or environment is provided by an enclosed container generally indicated at 70 forming a heat chamber or furnace 71. An upper removable cover indicated at 72 has a supporting arm 73 secured thereto and upon removal of removable flange 74, power means shown at 75 lifts cover 72 to permit access to chamber 71. Cover 72 carries an upper enclosed compartment 76 which has a removable cover 77 thereon and forms an enclosed space for receiving and feeding inserts 52 to a cutter body 24 within the compartment 71 formed within container 70. The sealed compartment may be purged of air by means of a vacuum source and a non-oxidizing or inert gas, such as nitrogen gas, is supplied from a suitable nitrogen bottle or the like (not shown) through a supply conduit 78 having suitable control valves 80, 82 therein, which may be butterfly valves, for example. Through regulations of valves 80 and 82 by suitable controls illustrated schematically at 84 the process gas is supplied by conduit 86 to the interior of compartment 70.

Cutter body 24 is previously formed with drilled sockets 54 to receive inserts 52 and surface defining sockets 54 preferably have a surface roughness between 16 microinches RMS and 40 microinches RMS. Likewise, peripheral surface 56 of inserts 52 is formed of a surface finish or roughness of around 16 microinches RMS. It is noted, however, that since the present operation is a full shrink fit, such a fit can be obtained even though the roughness of outer surface 56 and a roughness of an adjacent surface 54 is as high as around 125 microinches RMS, i.e. since a shearing of the asperities on the adjacent surfaces do not occur with a full shrink fit.

A stand shown generally at 88 is mounted within container 70 for holding cutter body 24 therein to receive inserts 52. Stand 88 includes an angle-shaped vertical support shown at 90 which is threaded onto a screw 92 actuated by suitable manual controls 94 for raising and lowering vertical support 90. Carried by vertical support 90 is a horizontally movable support 96 which is threaded onto a screw 98 controlled by suitable control 100. Mounted for pivotal movement about axis 101 on a vertical extension 102 of movable support 96 is an arm 104. A suitable control shown at 108 is utilized for pivoting or tilting of arm 104 about pivot 101 in a vertical plane relative to extention 102. Mounted on the extending end of arm 104 for relative rotative movement is an outer sleeve 110 in concentric relation to arm 104 and having a ring gear 112 thereabout. A drive gear 114 may be actuated by suitable controls at 116 for rotative movement of sleeve 110 about arm 104. Spring mounted blocks 118 are urged outwardly into engagement with the inner surface of cutter body 25 upon positioning of cutter body 25 onto sleeve 110.

The loading mechanism for inserts 52 includes a loading tube or guide 120 extending from its lower end adjacent cutter 24 to its upper end compartment 74. A slide 125 on support 121 has a plurality of cutting elements 52 thereon which are conducted to a position over guide 120. A separator 124 separates adjacent cutting elements 52 at the upper end of guide 120. A pair of pivotally mounted fingers 126 over guide 120 are controlled by suitable solonoids through line 128 from control panel 123. Upon actuation of fingers 126, an insert 52 drops by gravity or is lowered by means of an actuator with pickup (not shown) through tube 120 into an aligned socket 54.

Cutter body 25 prior to the insertion of inserts 52 is heated to a predetermined high temperature within heat chamber 71 of container 70 by heating elements 132 positioned along the walls of container 70. Heating elements 132 are heated electrically through lines 133 which may be controlled at control panel 123. Cutter body 25 is heated to a temperature of at least around 550° and as high as 1200° F. for certain types of metal materials and this temperature is maintained during the entire operation of mounting elements 52 within sockets 54. Cutting elements 52 are maintained at ambient temperature or may be chilled to a temperature as low as −450° F.

Figure 5:
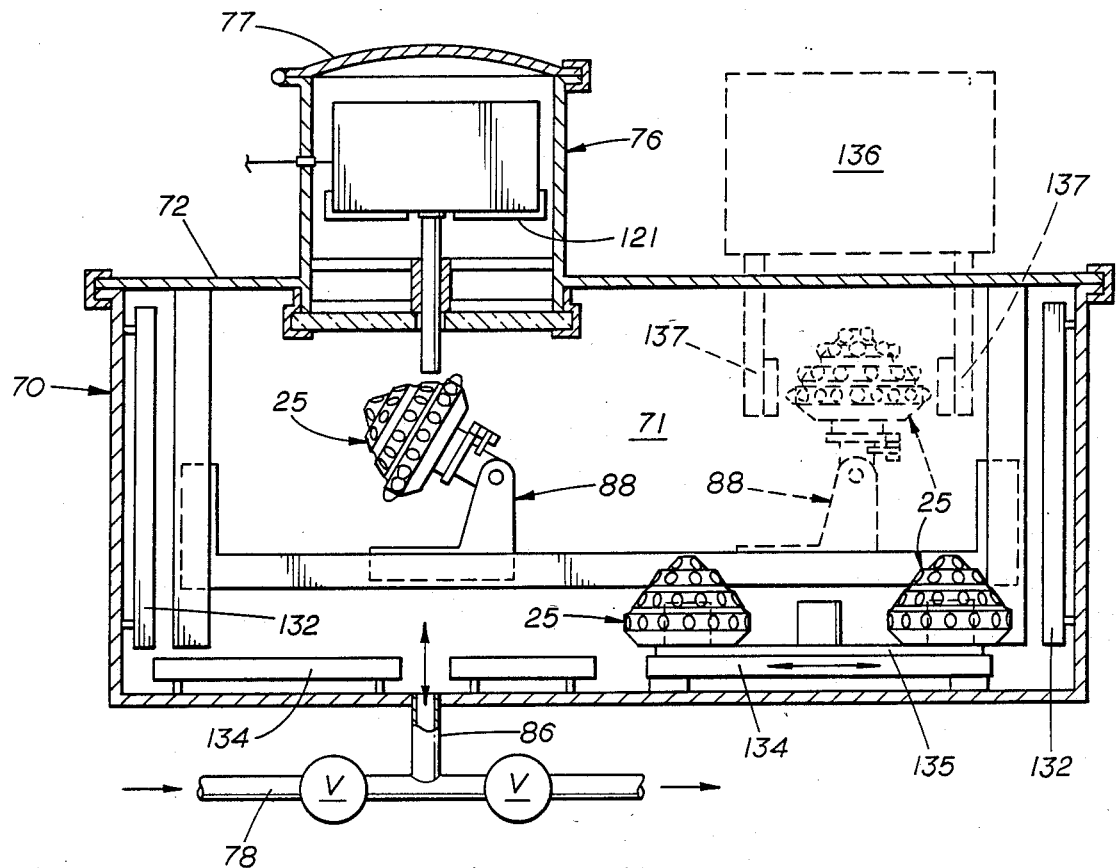
FIG. 5 is a sectional view, partly schematic, of a production-type apparatus for heating a plurality of cutter bodies to receive cutting inserts.

As shown in FIG. 5, a means of successively processing a plurality of cutter bodies 25 without opening the system is provided within container 70. Support tables 134 are provided on the floor of heat chamber 71 for the support of suitable pallets 135 or the like. At least one of the support tables 134 is mounted for horizontal movement within container 70 to support a pallet of cutter bodies 25 for heating to the desired temperature for the assembly of inserts 52 and to support the assembled cutter bodies 25 for subsequent cooling. Suitable robotic means shown generally at 136 includes a device having vertically and horizontally movable arms 137 for gripping cutter bodies 25 for movement between stand 88 and pallet 135. As shown in FIG. 5 stand 88 moves back and forth on suitable spaced rails extending between the assembly station beneath tube 120 and the loading and unloading station beneath robotic means 136. In operation, a pallet 135 supporting a plurality of cutter bodies 25 is positioned within chamber 71 of container 70 upon removal of cover 72. Then cover 72 is sealed into position over chamber 71. Next a vacuum is applied to chamber 78 to provide a pressure of around 100 millitorr, and then nitrogen gas is supplied through inlet 86 into chamber 71 until a positive pressure of around 3 P.S.I. is obtained. Next, heating elements 132 are energized for heating cutter bodies 25 to the desired temperature, such as 1000° F., for example.

After heating of unassembled cutter bodies 25 to the desired temperature, a cutter body 25 is removed from pallet 135 and placed onto stand 88 by externally manipulated arms 137 actuated externally by suitable means. A magazine containing cutting elements 52 has been previously loaded and a suitable indexing mechanism moves stand 88 and cutter body 25 thereon to the desired assembly station beneath tube 120 as shown in FIG. 5 so that a predetermined socket 54 is arranged beneath the lower end of tube 120. A mechanical or optical probe may be used to position socket 54 in true alignment with tube 120. Then, upon actuation of support arms 126 a cutting element 52 is inserted through tube 120 and drops or is lowered by an actuator with a pickup means (not shown) into socket 54 with a slip-fit as shown in FIG. 6. A minimum diametrical clearance of around 0.0002 inch to achieve an annular clearance 69 of around 0.0001 inch is provided between the outer peripheral surface 56 of cutting insert 52 and the adjacent peripheral surface 64 of socket 54. Insert 52 which is at an ambient temperature or may be chilled as low as −450° F. immediately expands and within around three to five seconds peripheral surface 56 contacts surface 64 to retain cutting element 52 in socket 54 provided suitable design criteria are met. Thus, gravity is utilized for holding inserts 52 in sockets 54 until firmly retained. However, it may be desirable under certain conditions to provide separate means (not shown) to hold cutting elements 52 within sockets 54 until cutting elements 52 are firmly secured within sockets 54.

Next, tube 120 is raised and cutter body 25 is rotated to another position at which another socket 54 is positioned beneath the lower end of tube 120 for receiving an insert 52. This is repeated until all of the sockets 54 have associated cutter elements 52 therein. It is to be understood, however, that after positioning of inserts 52 within sockets 54, no relative movement occurs between inserts 52 and sockets 54 before or after inserts 52 are retained by the interfering fit.

Then, as shown in FIG. 5, stand 88 with assembled cutter 25 is moved to the unloading station beneath arms 137. Arms 137 remove the assembled cutter 25 from stand 88 and places it onto a pallet 135 for subsequent cooling. Then table 134 and pallet 135 are moved horizontally for arms 137 to grip a predetermined heated unassembled cutter 25 on pallet 135 for positioning on stand 88 and subsequent movement of stand 88 beneath tube 120 for receiving inserts 52. This process is repeated until all of the cutter bodies 25 are assembled with inserts 52 positioned thereon.

After all of the cutter bodies 25 have inserts 52 positioned thereon, heating elements 132 are deenergized and cutter bodies 25 cooled to a temperature of around 150° F. in the inert atmosphere. The cooling cycle may be hastened by flowing furnace gas through a heat exchanger, or by introducing a stream of cool inert gas through the chamber, or by alternatively purging and backfilling with cool gas.

During the cooling of cutter body 25, a shrinkage or contraction of the metal material forming inserts 52 and body 25 occurs. Since inserts 52 are preferably formed of tungsten carbide and cutter body 25 is formed of a steel, different coefficients of expansion exist. The peripheral surface 64 of socket 54 and peripheral surface 56 of inserts 52 are deformed both by predominantly by elastic deformation during the cooling of cutter body 25 and an interference fit of at least around 0.001 inch for each inch of diameter of insert 52 is obtained.

While oxidation of the inserts 52 and sockets 54 is minimized or controlled by the reducing or inert atmosphere, other means may be utilized to control oxidation, such as by utilizing certain materials, such as stainless steel, or by the use of coatings, such as noble metals or tenacious non-reactive oxide, carbide, boride, or nitride compounds.

After cooling of cutters 24 to a desired temperature, the bearing surfaces on cutter body 25 such as ball races or groove 26 and annular thrust bearing surface 23 are selectively surface-hardened by suitable means, such as by lasers, induction, or electron beam heating. Alternate surface treatment means may be provided such as ion-nitriding, gas-nitriding, ion implantation, or localized plasma or fusion application of bearing materials. The alternate surface treatments are especially desirable in bearing designs where no rolling contact elements are utilized, thereby permitting relatively shallow surface interactions.

Next, the bearing surfaces are finished, such as by grinding to the desired surface to achieve dimensional and surface finish requirements. In order for cutter body 25 to maintain the elastic interference strains developed during shrink-fitting under the influence of cyclic loads encountered in drilling service, the material from which cutter body 25 is formed should have a minimum yield strength of at least around 160,000 psi after shrink fitting of the inserts and subsequent treatment steps. In order for the design interference level to be achieved between inserts 52 and sockets 54 by a full shrink fit in which fixtures are not utilized for retaining cutting elements 52 within the receiving sockets 54, the following criteria should be satisfied. The design interference is defined as the unrestrained insert diameter at ambient temperature minus the unrestrained hole diameter at ambient temperature or $$(1) \quad I = D_i^{Tr} - D_h^{Tr} \tag{1}$$

The condition to be met for a slip-fit installation shown by relationship 2 is given in terms of the relevant variables by relationship 2a as set forth below.

$$(2) \quad D_i^{T2} < D_h^{T1} \tag{2}$$

$$(2a) \quad D_i^{Tr}[1-(T_r-T_2)a_i] < D_h^{Tr}[1+(T_1-T_r)a_c] \tag{2a}$$

The condition to be met which allows for development of some interference at the cutter assembly temperature ($T_1$) shown by relationship 3 is given in terms of the relevant variables by relationship 3a as set forth below.

$$(3) \quad D_i^{T1} \geq D_h^{T1} \tag{3}$$

$$(3a) \quad D_i^{Tr}[1+(T_1-T_r)a_i] \geq D_h^{Tr}[1+(T_1-T_r)a_c] \tag{3a}$$

Wherein
$T_r$ = ambient temperature
$T_1$ = cutter assembly temperature
$T_2$ = insert assembly temperature
$D_i^T$ = insert diameter at specified temperature
$D_h^T$ = hole diameter at specified temperature
$a_i$ = coefficient of thermal expansion of insert
$a_c$ = coefficient of thermal expansion of cutter material As a specific but non limiting example of a material which has been found to be satisfactory for the shrink process described herein, cutter body 25 is formed of an AISI 4340 alloy steel. Insert 52 has a diameter of 0.625 inch and is formed of a tungsten carbide/cobalt composite having a ground surface of a finish of around 20 microinches RMS. Body 25 is forged at a temperature of around 2100° F., normalized, and then heat treated by a heating to a temperature of 1550° F. for 60 minutes and oil quenching. The cutter is tempered at about 950° F. to a hardness of 40 Rockwell C. Then, sockets 54 are drilled and reamed within cutter body 25 forming a surface finish of around 50 microinches RMS. Inserts 52 are of a diameter so that inserts 52 may slip-fit into the sockets 54 to provide an optimum interference range between 0.0020 to 0.0030 inch at room temperature.

After thus forming cutter bodies 25, the cutter bodies are arranged on a pallet and mounted on supports 134 within chamber 71 and are heated by heating elements 132 to a temperature of 950° F. in a dry nitrogen atmosphere. Then, cutter bodies 25 are positioned on stands 88 for mounting of inserts 52 within sockets 54 as previously described while cutter bodies 25 are maintained at the predetermined temperature of 950° F. After the inserts 52 are positioned within sockets 54, cutters 24 are cooled to room temperature in atmosphere. Thereafter, the bearing surfaces on cutter bodies 25 such as surfaces 23, 26 and 34 are selectively hardened by laser and ground to the desired surface finish.

While the specific examples set forth above indicate that the tempering or age hardening of cutter bodies 25 is accomplished prior to the placing of cutter bodies 25 within heat chamber 71, it is to be understood that the tempering or age hardening of cutter bodies 25 may be accomplished within heat chamber 71 prior to or during the insertion of cutting elements or inserts 52 within sockets 54.

Referring now to FIG. 8, a comparison is made for the press out force required for cutting inserts 52 inserted within sockets 54 in accordance with the above arrangement and an insert inserted within a similar cutter body by a press fit. As shown, for an interference fit of 0.0023 inch, the press out force for insert 52 inserted within socket 54 in accordance with the full shrink process of the present invention was around 23,500 lbs., whereas the press out force for an insert positioned by a press fit was around 7500 lbs. For an interference fit of around 0.003 inch, 29,600 lbs of force was required to press out insert 52 inserted by the full shrink process of the present invention, whereas a press out force of 10,800 lbs was required for an insert 52 inserted with press fit. Thus, around three times amount of force was required to press out a cutting insert positioned in a receiving socket in a full shrink process in accordance with the present invention as required for an insert press fitted within the socket in accordance with the prior art.

As another non-limited example of a cutter body material which has been found to be satisfactory for the present shrink fit process, a high strength structural steel of Teledyne Vasco grade T-200, 18 NI-Marage steel was utilized for cutter body 25 to provide a higher toughness for the core while maintaining a hardness similar to that obtained by quenched and tempered alloyed steel, such as the AISI 4140 steel above. The cutter body or shell was solutioned annealed and then machine finished with a semi-finished bore. Then, the cutter shell was drilled with the sockets for receiving the inserts and then age hardened for 3 hours at 900° F. Subsequently, cutters are positioned within chamber 71 for heating to a temperature of around 900° F. with the inserts being positioned in the manner as set forth above. Then, after cooling of the completed rolling cutter 24 in the inert atmosphere upon a removal of the heat supply, the cutters are removed from chamber 71 and the bore is ground to the desired finish. Next, the bore surfaces are selectively finished by ion-nitride processing.

From the above, a novel apparatus and process have been provided to form a rolling cutter with cutting inserts mounted within sockets on the rolling cutter in a full shrink process. The insertion of such cutting elements in such a manner provides an unusually high uniform interference fit along the length of the inserts and an unexpectedly high force is required in order to press out such inserts inserted within the sockets in such manner.

While preferred embodiments of the present invention have been illustrated, it is apparent that modifications and adaptations of preferred embodiments will occur to those skilled in the art. However, it is to be expressly understood that such modifications and adaptations are both within the spirit and scope of the present invention as set forth in the following claims.

What is claimed is:

1. A method of mounting cutting inserts within sockets of a metal roller cutter body of a rotary drill bit comprising the following steps:
   forming a cutter body of a metal material having a minimum yield strength of at least 160,000 psi after final assembly in the rotary drill bit;
   forming sockets in the cutter body;
   heating the roller cutter body with the socket formed therein to a predetermined temperature of at least around 500° F. in a controlled environment in a heat chamber;
   placing cutting inserts in a slip fit essentially by gravity within said sockets when said cutter body is heated to said predetermined temperature in said controlled environment with said inserts and sockets being sized to provide a clearance between the inserts and sockets when the inserts are initially positioned within the sockets; and
   cooling said cutter body to a predetermined low temperature within a controlled environment to provide an interference shrink fit between the sockets and the inserts of at least 0.001 inch for each inch of diameter of said inserts.

2. A method of mounting hard cutting inserts within sockets of a metal roller cutter body of a rotary drill bit comprising the following steps:
   forming a cutter body of a metal material having a minimum yield strength of at least 160,000 psi after final assembly in the rotary drill bit;
   forming a cylindrical socket in the cutter body;
   heating the roller cutter body with the socket formed therein in a controlled inert atmosphere in an enclosed heat chamber to a predetermined temperature of at least around 500° F. for a predetermined period of time;
   placing a cutting insert having a diameter less than the diameter of said socket when heated to said predetermined temperature within the socket in a slip fit in said inert atmosphere to provide a clearance between the insert and the socket extending for the entire depth of the socket; and
   cooling said cutter body to a predetermined low temperature in said inert atmosphere to provide an interference shrink fit between the socket and the insert of at least 0.001 inch for each inch of diameter of said insert.

3. A method for mounting cutting inserts within sockets of a metal roller cutter body of a rotary drill bit comprising the following steps:
   providing an enclosed chamber for an inert gas and to receive the roller cutter body therein;
   supplying an inert gas to said enclosed chamber;
   heating the cutter body within the enclosed chamber to a predetermined high temperature over around 500° F. in the inert atmosphere within the chamber;
   placing cutting inserts within the sockets of said cutter body in a slip fit essentially by gravity while the cutter body is heated to the predetermined high temperature in the inert atmosphere; and
   cooling the cutter body and inserts in said inert atmosphere after being placed within said sockets so that an interference fit between the inserts and cutter body is obtained from shrinkage of the cutter body.

4. A method for heating for a rotary drill bit including a generally conical roller cutter body having a plurality of sockets therein to a predetermined high temperature and then positioning a cutting insert within each of the sockets; said method comprising the following steps:
   forming the cutter body of a metal material having a minimum yield strength of at least 160,000 psi after final assembly in the rotary drill bit;
   forming an enclosed heating chamber in which the roller cutter body is maintained at a predetermined high temperature in a controlled atmosphere for receiving the cutting inserts;
   providing support means within the heating chamber for mounting the roller cutter body thereon;
   moving the roller cutter body to position the sockets at a desired position to receive the cutting elements;
   inserting the cutting elements essentially by gravity within the sockets while the cutter body is heated to the predetermined high temperature in the controlled atmosphere within the heating chamber; and
   cooling the cutter body and cutting inserts after being positioned in the sockets so that an interference fit of a predetermined amount is obtained between the inserts and cutter body from shrinkage of the cutter body upon cooling thereof.

5. A method for heating for a rotary drill bit including a generally conical roller cutter body having a plurality of sockets therein to a predetermined high temperature within a predetermined gaseous environment at a predetermined fluid pressure and then positioning cutting inserts within the sockets essentially by gravity; said method comprising the following steps:
   providing an enclosed container to form a heating chamber for the roller cutter body;
   heating the roller cutter body to a predetermined high temperature of over around 500° F. within the enclosed container;
   supplying a predetermined gas to the enclosed container at a predetermined pressure while the roller cutter body is heated and maintained at a predetermined high temperature over around 500° F.;
   mounting the roller cutter body within the container for movement to a predetermined position for accurately positioning the sockets to receive the cutting elements;

inserting the cutting elements essentially by gravity within the sockets while said cutter body is heated to said predetermined temperature in said predetermined gaseous environment; and cooling said cutter body and cutting inserts after being positioned in said sockets so that an interference fit is obtained between said inserts and cutter body from shrinkage of said cutter body upon cooling thereof.

6. Apparatus for mounting hard cutting inserts within sockets of a metal roller cutter body of a rotary drill bit comprising:

means forming a chamber for an inert gas and adapted to receive the roller cutter body therein;

means to supply an inert gas to said chamber;

means to heat the cutter body within the chamber to a predetermined high temperature over around 500° F. in the inert environment within the chamber;

means to position cutting inserts within the sockets of said cutter body without any press fitting of the inserts being required and while the cutter body is heated to the predetermined high temperature with said inserts expanding outwardly after being inserted; and means for cooling the cutter body and inserts after being placed within said sockets so that a predetermined interference fit between the inserts and cutter body is obtained from shrinkage of said cutter body resulting from cooling thereof.

7. Apparatus for mounting cylindrical tungsten carbide cutting elements within sockets of a metal roller cutter body of a rotary drill bit comprising:

means forming an enclosed chamber to receive the roller cutter body therein;

heating means within said chamber to heat a roller cutter body in a controlled atmosphere within said chamber to a predetermined high temperature over at least around 500° F.;

a stand within said chamber for receiving a roller cutter body thereon and mounted for rotating and tilting movements to position a selected socket on said cutter body so that its longitudinal axis extends in a general vertical direction;

means to position a cutting insert within said selected socket essentially by gravity from a position over said socket while said cutter body is heated to the predetermined temperature; and means for cooling the cutter body and insert in said controlled atmosphere within said enclosed chamber after being placed within said selected socket so that an interference fit is obtained between said selected socket and associated insert.

8. An apparatus for mounting cutting inserts within a plurality of sockets arranged in annular rows within a generally conical roller cutter body of a rotary drill bit comprising:

an enclosed heat chamber for heating the roller cutter body to a predetermined high temperature in a controlled non-oxidizing atmosphere;

support means within the heat chamber on which the roller cutter body is mounted including means to move said cutter body in a generally vertical direction, means to move said cutter body in a generally horizontal direction, means to rotate said roller cutter body, and means to tilt said roller cutter body in a generally vertical plane; and insert feeding means over the roller cutter body having a plurality of cutting inserts and feeding an insert essentially by gravity into an aligned subjacent socket on the roller cutter body in the controlled non-oxidizing atmosphere.

9. Apparatus for heating a generally conical roller cutter body having a plurality of sockets therein to a predetermined high temperature and then positioning a cutting insert within each of the sockets; said apparatus comprising:

a heating chamber in which said roller cutter body is maintained in a controlled non-oxidizing atmosphere at a predetermined high temperature over around 500° F. for receiving said cutting elements;

support means within said heating chamber on which said roller cutter body is mounted for moving said roller cutter body to position said sockets at a desired position to receive said cutting elements;

means to insert said cutting elements essentially by gravity within said sockets while said cutter body is heated to said predetermined high temperature in said controlled non-oxidizing atmosphere; and means to cool said cutter body and cutting inserts after being positioned within said sockets so that an interference fit of at least around 0.001 inch for each inch of diameter of said inserts is obtained between said inserts and cutter body from shrinkage of said cutter body upon cooling thereof.

10. Apparatus for heating for a heating drill bit a generally conical roller cutter body having a plurality of sockets thereon to a predetermined high temperature within a predetermined gaseous environment at a predetermined fluid pressure and then positioning cutting inserts within the sockets essentially by gravity; said apparatus comprising:

an enclosed container forming a heating chamber in which said roller cutter body is maintained at a predetermined high temperature over around 500° F. for receiving said cutting elements;

means to supply a predetermined gas to said enclosed container under a predetermined pressure;

means mounting said roller cutter body within said container for movement to a predetermined position for accurately positioning said sockets to receive said cutting elements;

means to insert said cutting elements essentially by gravity within said sockets while said cutter body is heated to said predetermined high temperature in said predetermined gaseous environment; and means to cool said cutter body and cutting inserts after being positioned within said sockets so that an interference fit is obtained between said inserts and said cutter body from shrinkage of said cutter body upon cooling thereof.

11. Apparatus as set forth in claim 10 wherein said predetermined gas is an inert gas and said interference fit obtained from shrinkage of said cutter body is at least around 0.001 inch per inch of diameter of said insert.

12. Apparatus as set forth in claim 10 wherein said means to insert said cutting elements within said sockets includes a generally vertical feed tube positioned over said cutter body, and means to feed selectively cutting inserts to said feed tube for positioning within an aligned socket essentially by gravity in a slip fit.

13. Apparatus as set forth in claim 12 wherein said means mounting said roller cutter body within said container comprises a stand on which said roller cutter body is mounted, and means are provided to rotate said roller cutter body relative to said feed tube for positioning a desired socket beneath the feed tube for receiving a cutting insert.

14. Apparatus for mounting cutting elements in a roller cutter body having sockets therein to receive the cutting elements essentially by gravity and comprising:
   a lower enclosed chamber including means for supporting the roller cutter body;
   heating means within the lower enclosed chamber for heating the roller cutter body to a predetermined high temperature;
   a removable cover over the lower chamber and permitting access to the chamber;
   an upper chamber carried by said removable cover and positioned over the roller cutter body;
   a plurality of cutting elements supported within said upper chamber;
   a generally vertically extending tube extending from said upper chamber to said lower chamber at a position over said roller cutter body; and
   means to feed selectively a selected cutting element through said tube for insertion of the selected cutting element within an aligned socket in said cutter body.

15. Apparatus as set forth in claim 14 wherein a stand is mounted within said lower chamber and supports said roller cutter body thereon; and
   means are provided to rotate said roller cutter body relative to the lower end of said tube for aligning a socket in said cutter body with said tube for receiving a cutting element therefrom.

16. Apparatus as set forth in claim 15 wherein means are provided for moving said stand horizontally and vertically within said lower chamber.

17. Apparatus as set forth in claim 16 wherein means are provided for tilting said cutter body in a vertical plane relative to said stand.

18. Apparatus as set forth in claim 15 wherein means are provided within said upper chamber for moving said tube vertically relative to said roller cutter body.

19. Apparatus as set forth in claim 14 wherein a removable cover is positioned over the upper chamber to provide access thereto for receiving cutting elements.

20. A composite structure for heating a roller cutter body for a rotary drill bit in a predetermined gaseous atmosphere to a predetermined high temperature over around 500° F. and then inserting cutting elements essentially by gravity within sockets in the cutter body; and structure comprising:
   a lower enclosed heating chamber having means therein supporting the roller cutter body for movement to a predetermined position within the chamber;
   means to supply a predetermined gas to said lower chamber;
   means to heat the roller cutter body within the lower chamber to a predetermined high temperature over around 500° F.;
   a removable cover over the lower chamber to permit access to the lower chamber;
   an upper chamber carried by said removable cover and positioned over the roller cutter body;
   a generally vertically extending feed tube extending from said upper chamber to said lower chamber at a position over said roller cutter body;
   means to feed a cutting element through said tube for insertion within an aligned socket in said cutter body while said cutter body is heated to a predetermined high temperature; and
   means to cool said cutter body and cutting element after being inserted within an aligned socket so that an interference fit is obtained between said cutting element and cutter body from shrinkage of said cutter body upon cooling thereof.

21. The composite structure as set forth in claim 20 wherein said predetermined gas in an inert gas and said interference fit obtained from shrinkage of said cutter body is at least around 0.001 inch per inch of diameter of said cutting element.

22. The composite structure as set forth in claim 20 wherein said means within the lower chamber supporting the roller cutter body includes means for rotating said roller cutter body and means for tilting said roller cutter body in a vertical plane.

* * * * *